US012798667B2

(12) United States Patent
Bergmann et al.

(10) Patent No.: US 12,798,667 B2
(45) Date of Patent: Nov. 17, 2026

(54) HYDRAULIC STEERING DEVICE

(71) Applicant: HYDAC NEW TECHNOLOGIES GMBH, Sulzbach/Saar (DE)

(72) Inventors: Erhard Bergmann, Banzkow (DE); Markus De La Motte, Muchow (DE); Helmut Funk, Karrenzin (DE)

(73) Assignee: HYDAC NEW TECHNOLOGIES GMBH, Sulzbach/Saar (DE)

( * ) Notice: Subject to any disclaimer, the term of this patent is extended or adjusted under 35 U.S.C. 154(b) by 681 days.

(21) Appl. No.: 18/032,689

(22) PCT Filed: Sep. 28, 2021

(86) PCT No.: PCT/EP2021/076660
§ 371 (c)(1),
(2) Date: Apr. 19, 2023

(87) PCT Pub. No.: WO2022/089862
PCT Pub. Date: May 5, 2022

(65) Prior Publication Data

US 2024/0017764 A1 Jan. 18, 2024

(30) Foreign Application Priority Data

Oct. 27, 2020 (DE) ..................... 10 2020 006 585.6

(51) Int. Cl.
*B62D 5/09* (2006.01)
*B62D 5/06* (2006.01)
*B62D 5/093* (2006.01)

(52) U.S. Cl.
CPC ............. *B62D 5/093* (2013.01); *B62D 5/062* (2013.01)

(58) Field of Classification Search
CPC ........... B62D 5/062; B62D 1/22; B62D 5/093
See application file for complete search history.

(56) References Cited

U.S. PATENT DOCUMENTS 5,953,978 A * 9/1999 Bohner .................... B62D 5/06 91/375 R
6,408,977 B1 * 6/2002 Obertrifter ............... B62D 5/09 180/417

(Continued)

FOREIGN PATENT DOCUMENTS

DE 41 08 915 9/1992
DE 198 18 111 10/1999

(Continued)

OTHER PUBLICATIONS

International Search Report (ISR) issued Dec. 23, 2021 in International (PCT) Application No. PCT/EP2021/076660.

*Primary Examiner* — Abiy Teka
(74) *Attorney, Agent, or Firm* — Wenderoth, Lind & Ponack, L.L.P.

(57) ABSTRACT

A hydraulic steering device includes a steering unit, a steering actuator configured to be actuated by the steering unit, and a flow-regulating valve arrangement configured to actuate the steering actuator. The flow-regulating valve arrangement includes a discharge valve and a directional valve. The discharge valve is a proportional servo valve. The directional valve is configured to: (i) in an unactuated position, block a fluid-conveying connection between the discharge valve and the steering actuator; and (ii) in an actuated position, actuate the steering actuator in a first steering direction or a second direction.

17 Claims, 2 Drawing Sheets

(56) References Cited

U.S. PATENT DOCUMENTS

| | | | | |
|---|---|---|---|---|
| 2008/0202841 | A1 | 8/2008 | Biener | |
| 2019/0002018 | A1 | 1/2019 | Bergmann et al. | |
| 2019/0111967 | A1* | 4/2019 | Bergmann ............... | B62D 5/09 |
| 2019/0241212 | A1 | 8/2019 | Pedersen et al. | |

FOREIGN PATENT DOCUMENTS

| | | | |
|---|---|---|---|
| DE | 102 52 215 | 10/2004 | |
| DE | 198 55 405 | 3/2005 | |
| DE | 10 2007 033 986 | 2/2008 | |
| DE | 10 2009 013 633 | 9/2010 | |
| DE | 10 2011 016 591 | 11/2011 | |
| DE | 10 2011 112 625 | 3/2013 | |
| DE | 10 2016 104 090 | 6/2017 | |
| DE | 10 2018 102 465 | 8/2019 | |
| EP | 1 910 151 | 10/2010 | |
| EP | 2 753 531 | 3/2016 | |
| EP | 3 470 300 | 4/2019 | |
| WO | 2008/017290 | 2/2008 | |
| WO | WO-2008017290 A1 * | 2/2008 | ............... B62D 5/32 |

* cited by examiner

HYDRAULIC STEERING DEVICE

BACKGROUND OF THE INVENTION

1. Field of the Invention

The invention relates to a hydraulic steering device having a steering actuator, which can be actuated by a steering unit, and having a flow-regulating valve arrangement, which is also used to actuate the steering actuator.

2. Description of the Related Art

EP 2 753 531 B1 describes a hydraulic steering device that hydraulically connects a steering cylinder to a supply system, wherein the supply system can be hydraulically operatively connected to the steering cylinder via a steering valve to form a main flow connection, and the supply system can be hydraulically operatively connected to the steering cylinder via a flow-regulating valve arrangement to form a secondary flow connection that bypasses the main flow connection, wherein the flow-regulating valve arrangement can be actuated by an electric control unit. The flow-regulating valve arrangement to this effect comprises individually actuated valve groups, each of which is installed in the supply line and in the return line of the bypass flow connection, wherein the flow-regulating valve arrangement comprises four valves, of which one valve is installed in the supply line of a right-hand drive, one valve is installed in the return line of a left-hand drive, one valve is installed in the supply line of a left-hand drive and one valve is installed in the return line of a right-hand drive. In this way, it is possible to detect and eliminate any faults in the bypass connection by means of a plausibility check of the actuation signals of the valves and of an output signal, in particular a response of the steering cylinder. This provides a fault-tolerant electrohydraulic steering system that operates according to the steer-by-wire principle and at the same time provides the option of being used on vehicles having the official approval and homologation for road service.

A similar hydraulic steering device is also described in EP 3 470 300 A1, which provides a release-shutoff valve installed between the flow-regulating valve arrangement and the steering cylinder. In this way, pressure losses at the hydraulic steering device can be reduced and a hydraulic transport device of the supply system for the steering cylinder does not have to overcome a counter-pressure. In particular, if there is no steering demand on the hydraulic steering device, the load pressure can be compensated in this way.

Furthermore, EP 1 910 151 B1 discloses an electrohydraulic steering system having a steering unit, which can be actuated via an operating element, for supplying a steering motor with pressure medium, which steering motor can be supplied with an additional quantity of pressure medium via a steering valve arranged in an additional pressure medium flow path between a pressure medium source and the steering motor, that can be continuously adjusted and actuated as a function of the actuation of the operating element or as a function of an external signal, and having a nonreturn valve, which is arranged in the additional pressure medium flow path and can be moved into a blocked position in order to block the additional pressure medium flow path to the steering motor. Sensors are provided for detecting the steering-valve setting and/or the nonreturn-valve setting and a control unit, which is used to evaluate the signal generated by a sensor. The control unit is designed in such a way that in the event of failure or malfunction of one of the valves, the other valve can be moved to its blocked position.

Based on this prior art, the invention addresses the problem of further improving the known solutions, while retaining the advantages described above, to achieve a functionally reliable actuation of the steering actuator with high steering dynamics using only very few valve components.

SUMMARY OF THE INVENTION

A hydraulic steering device described herein solves this problem.

Because the flow-regulating valve arrangement has a discharge valve, which is designed as a proportional servo valve, and a directional valve, which, in its unactuated position, blocks the fluid-conveying connection between the discharge valve of the flow-regulating valve arrangement and the steering actuator and, in its actuated position, actuates the steering actuator in one or the other steering direction, an incorrect supply fluid pressure existing in the pressure fluid supply, for instance due to incorrectly operating components of the hydraulic steering device in the supply, does not cause an undesired steering motion. In that way, the discharge valve of the flow-regulating valve arrangement can be used to regulate, in particular limit, the volume flow starting from the steering actuator in the direction of the tank, such that a fluid pressure in the fluid space of the steering actuator currently connected to the tank can be reduced in a regulated manner towards the tank, whereby the motion of the piston of the steering actuator and thus the steering motion can be influenced in a corrective manner. In contrast, if the discharge valve of the flow-regulating valve arrangement is omitted, an incorrectly applied supply pressure in the pressure medium supply of the steering actuator has the effect that one fluid chamber of the steering actuator is incorrectly pressurized and, causing a motion of the piston of the steering actuator, the fluid pressure in the other fluid chamber of the steering actuator is abruptly transferred towards the tank, resulting in a dangerous unintentional steering motion. As a result, the steering device according to the invention achieves a functionally reliable actuation of the steering actuator at high steering dynamics using only very few valve components.

In an advantageous embodiment of the steering device, provision is made for the steering unit to have a further discharge valve. The further discharge valve can be used to regulate, in particular limit, the volume flow from the steering actuator via the steering unit in the direction of the tank, such that a fluid pressure in the fluid chamber of the steering actuator currently connected to the tank can also be reduced in a regulated manner towards the tank via the steering unit. This further counteracts dangerous unintentional steering motions.

In an advantageous embodiment of the steering device, provision is made for the flow-regulating valve arrangement to have a supply valve, which is designed as a proportional servo valve, and for the directional valve to block the connection between the supply valve and the steering actuator in the unactuated position. As a result, a functionally reliable steering operation is achieved using only very few valve components that can be operated in a fail-safe manner. This applies in particular to an incorrectly open position of the supply valve, because in that case at least one of the discharge valves takes over the flow regulation function, preventing any dangerous steering motions from occurring. In addition, when the directional valve is switched, the supply valve and discharge valve, which are designed as proportional servo valves, can be actuated at high dynamics, which benefits the overall improved steering dynamics. The valve arrangement of the steering device can compensate any steering malposition, for instance caused by leakage losses.

In an advantageous embodiment of the steering device, provision is made for the steering unit and the flow-regulating valve arrangement to be supplied by a common supply device, wherein the supply device further preferably has a swivel angle pump, which can be actuated by a load-sensing pressure, which is tapped in the steering unit and which can be influenced by a control pressure, which is tapped in a supply line between the supply valve and the directional valve. In that way, the steering actuator can be supplied with the required actuation flow of fluid as needed at a short response time, which in turn is beneficial for the steering dynamics.

In this respect, provision can preferably be made for a further proportional servo valve to be used to actuate the load-sensing pressure for the swivel-angle pump, which valve, on opposite control ends, is exposed on the one hand to the control pressure in a control line and on the other hand to a further control pressure in the feed line to the swivel-angle pump.

The proportional servo valves used are preferably designed as proportional valves and the directional valve is preferably designed as a switching valve, in particular having three switching positions.

In a preferred embodiment of the steering device according to the invention, a pressure sensing device is connected to at least one fluid line connected to the directional valve, in particular to the supply line between the supply valve and the directional valve. The pressure values collected by means of the pressure sensing device are used to determine the switching position of the directional valve. Detecting the switching position via the pressure sensing device is technically easier to implement than detecting the switching position by means of displacement transducers or limit switches.

In a further preferred embodiment of the steering device according to the invention, the steering unit and the flow-regulating valve arrangement are connected in a hydraulically parallel arrangement, which in this way jointly actuate the steering actuator as required, wherein the steering unit provides a type of main power supply and the flow-regulating valve arrangement provides a type of auxiliary power supply for the steering unit. In this way, the actuation lines of the steering unit are preferably introduced into the connecting lines between the directional valve and the steering actuator. Thus, for rapid, dynamic steering motions at higher speeds, the flow-regulating valve arrangement can be connected as an additional supply to the actual supply via the steering unit.

BRIEF DESCRIPTION OF THE DRAWINGS

Below, the steering device according to the invention is explained in more detail with reference to the drawings. In the figures, in schematic representation, not to scale.

DETAILED DESCRIPTION OF THE INVENTION

Figure 1:
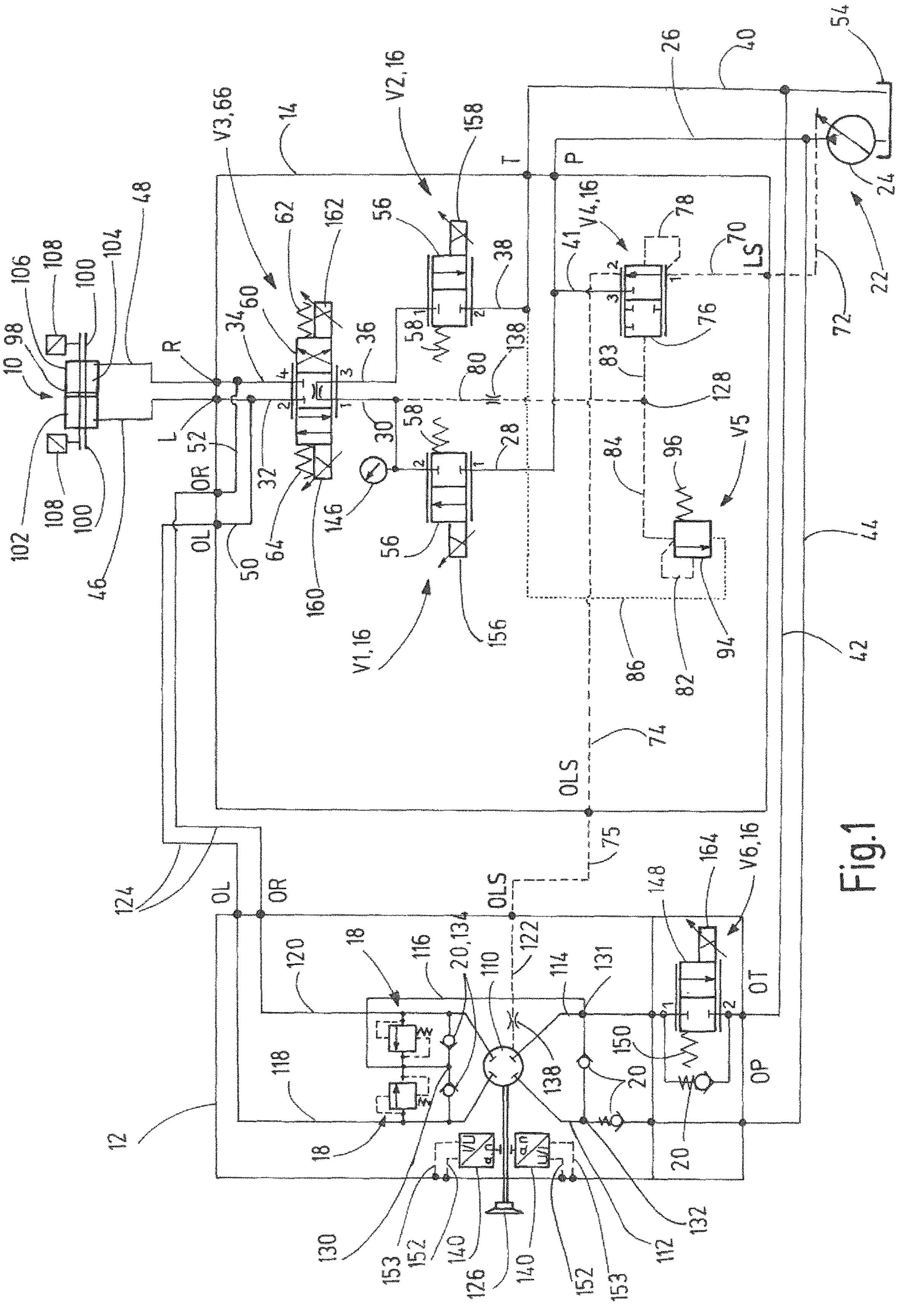
FIG. 1 shows the steering device according to the invention in the manner of a hydraulic circuit diagram.

The hydraulic steering device has a steering actuator 10 and a steering unit 12 and a flow-regulating valve arrangement 14, which are each used to actuate the steering actuator 10. In terms of its structure and function, the steering unit 12 is equal to the solution known from the prior art according to DE 10 2007 033 986 A1 or DE 10 2011 016 591 A1.

The flow-regulating valve arrangement 14 has a supply valve V1 and a discharge valve V2 and a directional valve V3, which in its unactuated position blocks the fluid-conveying connection between the supply valve V1 or the discharge valve V2 of the flow-regulating valve arrangement 14 and the steering actuator 10 and in its actuated position actuates the steering actuator 10 in one direction or the other. The supply valve V1 and the discharge valve V2 of the flow-regulating valve arrangement 14 are each designed as a proportional servo valve 16.

A supply device 22 is provided for jointly supplying the flow-regulating valve arrangement 14 and the steering unit 12 with pressure fluid. This device is designed as an axial piston pump 24, also known as a swivel angle pump, for converting mechanical energy (torque, speed) into hydraulic energy (volume flow, pressure) as a function of a predefinable swivel angle. The high-pressure end of the pump 24 is connected to a pressure-supply port P of the flow-regulating valve assembly 14 via a first fluid line 26.

The pressure-supply port P of the flow-regulating valve arrangement 14 is connected to a first port V1.1 of the supply valve V1 via a second fluid line 28 in a fluid-conveying manner, the second port V1.2 of which supply valve V1 is connected to a first port V3.1 of the directional valve V3 via a third fluid line 30. The second port V3.2 of the directional valve V3 is connected to a port L of the flow-regulating valve assembly 14 for connecting the steering actuator 10 via a fourth fluid line 32 in a fluid-conveying manner. A port R of the flow-regulating valve arrangement 14 also for connecting the steering actuator 10 is connected in a fluid-conveying manner to the fourth port V3.4 of the directional valve V3 via a fifth fluid line 34, the third port V3.3 of which is connected to a first port V2.1 of the discharge valve V2 of the flow-regulating valve arrangement 14 via a sixth fluid line 36. The second port V2.2 of the discharge valve V2 of the flow-regulating valve assembly 14 is connected to a tank port T of the flow-regulating valve arrangement 14 via a seventh fluid line 38.

The tank port T of the flow-regulating valve arrangement 14 is connected 40 to a tank 54, from which the axial piston pump 24 draws fluid, via an eighth fluid line.

The supply valve V1 and the discharge valve V2 of the flow-regulating valve arrangement 14 each have a valve piston 56, which is pressurized by a first compression spring 58 in the direction of its first end position shown in FIG. 1, and which can be moved from its first end position to its second end position against the force of this first compression spring 58 by electromagnetic actuation. If the valve piston 56 of the supply valve V1 and of the discharge valve V2 of the flow-regulating valve arrangement 14 is arranged in its first end position, it separates the first ports V1.1, V2.1 and the second ports V1.2, V2.2 of the respective valves V1, V2 from each other, whereas this valve piston 56, arranged in its second end position, interconnects the first ports V1.1, V2.1 and the second ports V2.1, V2.2 of the respective valves V1, V2 in a fluid-conveying manner.

One end of the valve piston 60 of the directional valve V3 is pressurized by a second compression spring 62 and the other end is pressurized by a third compression spring 64, respectively, and is held in its first switching position shown in FIG. 1. The valve piston 60 of the directional valve V3 can be moved from its first switching position to its second or third switching position, respectively, against the force of the second 62 and third 64 compression springs by electromagnetic actuation. Arranged in the first switching position, the valve piston 60 of the directional valve V3 separates the ports V3.2 and V3.4 respectively from all other ports V3.1, V3.2, V3.3, V3.4 of the directional valve V3 and interconnects the ports V3.1 and V3.3 via a restrictor or an orifice in a fluid-conveying manner. When the valve piston 60 of the directional valve V3 is arranged in its second switching position, the first V3.1 and second V3.2 ports of the directional valve V3 are interconnected in a fluid-conveying manner via a fluid path, and its fourth V3.4 and third V3.3 ports are interconnected in a fluid-conveying manner via a further fluid path. In the third switching position of the valve piston 60 of the directional valve V3, the valve piston 60 connects the first port V3.1 of the directional valve V3 to its fourth port V3.4 via a fluid path and the second port V3.2 of the directional valve V3 to its third port V3.3 via a further fluid path. The directional valve V3 is a 4/3-way switching valve 66.

A pressure sensing device 146 in the form of a pressure gauge is connected to the third fluid line 30 between the supply valve V1 and the directional valve V3. The pressure values collected by means of the pressure detection device 146 are used at least to determine the switching position of the directional valve V3.

A further proportional servo valve V4 is provided, the first port V4.1 of which is connected to a load-sensing port LS of the flow-regulating valve arrangement 14 via a first load-sensing line 70 for routing a load-sensing pressure, which load-sensing port LS is connected to the axial piston pump 24 via a second load-sensing line 72 for routing the load-sensing pressure in a fluid-conveying manner in order to influence the swivel angle of the axial piston pump. A second port V4.2 of the further proportional servo valve V4 is connected to a port OLS of the flow-regulating valve arrangement 14 via a third load-sensing line 74 for connecting a load-sensing or load signal output OLS of the steering unit 12 via a fourth load-sensing line 75. A third port V4.3 of the further proportional servo valve V4 is connected to the second fluid line 28 via a ninth fluid line 41.

In the direction of the first end position of a valve piston 76 of the further proportional servo valve V4 shown in FIG. 1, the further fluid pressure or control pressure in the first load-sensing line 70 between the further proportional servo valve V4 and the load-sensing connection LS, which is tapped in the first load-sensing line 70, acts on this further proportional servo valve V4 via a first control line 78. The fluid pressure or control pressure in the third fluid line 30 between the supply valve V1 and the directional valve V3 acts on the piston in the direction of the second end position of the valve piston 76 of the further proportional servo valve V4, which fluid pressure or control pressure is tapped in the third fluid line 30, is routed to a first branching point 128 via a second control line 80, which first branching point is connected to the further proportional servo valve V4 via a third control line 83. A restrictor or an orifice 138 is installed in the second control line 80. When the valve piston 76 of the further proportional servo valve V4 is arranged in its first end position, the first V4.1 and the second V4.2 ports of the further proportional servo valve V4 are interconnected in a fluid-conveying manner via a fluid path, whereas the first V4.1 and second V4.2 ports are separated from each other when the valve piston 76 is arranged in its second end position. The third port V4.3 of the further proportional servo valve V4 is separated from the other ports V4.1 and V4.2 in both end positions.

The supply valve V1 and the discharge valve V2 of the flow-regulating valve arrangement 14 are each designed as 2/2-way proportional valves and the further proportional servo valve V4 is designed as a 3/2-way proportional valve. However, it is also conceivable to design the further proportional servo valve V4 as a 2/2-way proportional valve.

A tank outlet OT of the steering unit 12 is connected to the eighth tank fluid line 40 via a tenth fluid line 42.

The input end of a pressure relief valve V5 is connected to the first branching point 128 via a fourth control line 84 and the output end is connected to the tank port T via a fifth control line 86. Fluid pressure in the fourth control line 84 acts on one end of a valve piston 94 of the pressure relief valve V5, which fluid pressure is directed to one end of the valve piston 94 of the pressure relief valve V5 via a sixth control line 82. The other end of the valve piston 94 of the pressure relief valve V5 is subjected to the force of a further compression spring 96.

A pressure supply input OP of the steering unit 12 is connected to the first pressure supply fluid line 26 via an eleventh fluid line 44.

The steering actuator 10 is designed as a single constant velocity cylinder, also called a double rod cylinder, which has a piston rod 100 on each end of its piston 98 as part of a steering gear for turning vehicle wheels of a vehicle, which is not shown in the figure. The steering actuator 10 may also be formed by two diagonally interconnected differential cylinders. The piston 98 separates a first fluid chamber 102 from a second fluid chamber 104 in the housing 106 of the steering actuator 10. The steering actuator 10 is provided with a common position monitor 108, which is used to monitor the travel position of its piston 98. The first fluid chamber 102 and the second fluid chamber 104 of the steering actuator 10 are connected to the port L via a twelfth fluid line 46 and to the port R of the flow-regulating valve arrangement 14 via a thirteenth fluid line 48.

The flow-regulating valve arrangement 14 further comprises the ports OL and OR, which are connected to the fourth fluid line 32 between the second port V3.2 of the directional valve V3 and the port L of the flow-regulating valve arrangement 14 via a fourteenth fluid line 50, and to the fifth fluid line 34 between the fourth port V3.4 of the directional valve V3 and the port R of the flow-regulating valve arrangement 14 via a fifteenth fluid line 52, respectively.

The steering unit 12 essentially consists of a rotor set (metering pump 110) and a manually operated servo valve 110 of rotary vane design. Such steering units 12 (Orbitrol) are state of the art, i.e., a detailed description of the design of the manually operated servo valve 110 and the metering pump 110, which operates according to the gerotor principle, is omitted.

In the circuit diagram shown in FIG. 1, the manually operated servo valve 110 and the metering pump 110 are indicated by the circular symbol for an orbitrol. The metering pump servo valve unit 110 is connected in a fluid-conveying manner to the pressure-supply port OP and to the tank port OT of the steering unit 12 via a pressure supply channel 112 and via a first tank channel 114 in the steering unit 12, and to the ports OL and OR of the steering unit 12 via a first 118 and a second 120 working channel in the steering unit 12, each of which is connected in a fluid-conveying manner to the respective ports OL, OR of the flow-regulating valve arrangement 14 via a fluid line 124.

As a result of this embodiment, when a manual steering wheel 126 mechanically connected to the metering pump 110 is actuated, pressurized fluid is delivered into the one 102, 104 or the other 104, 102 fluid chamber as a function of the direction of rotation of the manual steering wheel, and pressurized fluid accordingly flows out of the respective other 102, 104 fluid chamber toward the tank 54.

A further pressure relief valve 18 is connected to the input end of each of the first 118 and second 120 working channels, both of which are connected to a second branching point 130 on the output end. Between the first 118 or second 120 working channels and the second branching point 130, each, there is an after-suction valve 134 in the form of a check valve 20 installed in parallel with the relevant further pressure relief valve 18, which opens in the direction of the first 118 or second 120 working channel. The second branching point 130 is connected to a third branching point 131 in the first tank channel 114 via a second tank channel 116. The two ports OL, OR connected to the steering actuator 10 are protected by the two further pressure relief valves 18. If one of the further pressure relief valves 18 is activated, the pressurized fluid is routed to the opposite end via the suction valve 134 of the low-pressure end. In addition, pressure medium can be sucked out of the tank 54 via the two suction valves 134.

A load-sensing channel 122 is provided between the tank port of the metering pump servo valve assembly 110 and the port OLS of the steering unit 12, in which an orifice 138 or restrictor is installed. The port OLS of the steering unit 12 is connected to the corresponding port OLS of the flow-regulating valve arrangement 14 via the load-sensing line 75 in a fluid-conveying manner. The pressure supply channel 112 and the first tank channel 114 are interconnected via a check valve 20, which at the supply end is connected to the third branching point 131 in the first tank channel 114 and at the discharge end is connected to a fourth branching point 132 in the pressure supply channel 112 and opens in the direction thereof. A check valve 20 is also provided in the pressure supply channel 112 of the steering unit 12 between the fourth branching point 132 and the port OP of the steering unit 12, which opens in the direction of the second branching point 132 against the force of a further compression spring.

In the first tank channel 114, between the third branching point 131 and the tank outlet OT, a further discharge valve of the steering unit 12 is provided in the form of a flow-regulating valve V6 for regulating the tank volume flow, which valve is designed as a proportional servo valve in the form of a 2/2-way proportional valve. The flow-regulating valve V6 has a valve piston 148, on which a further compression spring 150 acts in the direction of its first end position shown in FIG. 1 and which can be moved from its first end position to its second end position against the force of this further compression spring 150 by electromagnetic actuation. When the valve piston 148 of the flow-regulating valve V6 is arranged in its first end position, it separates the first V6.1 and the second V6.2 ports of the flow-regulating valve V6 from each other, whereas when this valve piston 148 is arranged in its second end position, it interconnects the first V6.1 and the second V6.2 ports of the flow-regulating valve V6 in a fluid-conveying manner. The flow-regulating valve V6 (failure impact valve) limits the tank volume flow of the Orbitrol as a function of the speed of the manual steering wheel, such that a fully open supply valve V1 does not affect the steering speed in the event of a failure.

In the de-energized state 156, 158, 160, 162, 164, the supply valve V1, the discharge valve V2, the directional valve V3 and the flow-regulating valve V6 are arranged in their first positions.

Parallel to the flow-regulating valve V6, a check valve 20 is installed in the first tank channel 114 between the third branching point 131 and the tank outlet OT for sucking fluid from the tank T, which check valve opens against a further pressure spring in the direction of the third branching point 131.

A steering angle command sensor 140 is provided to determine the steering motion at the manual steering wheel 126.

Figure 2:
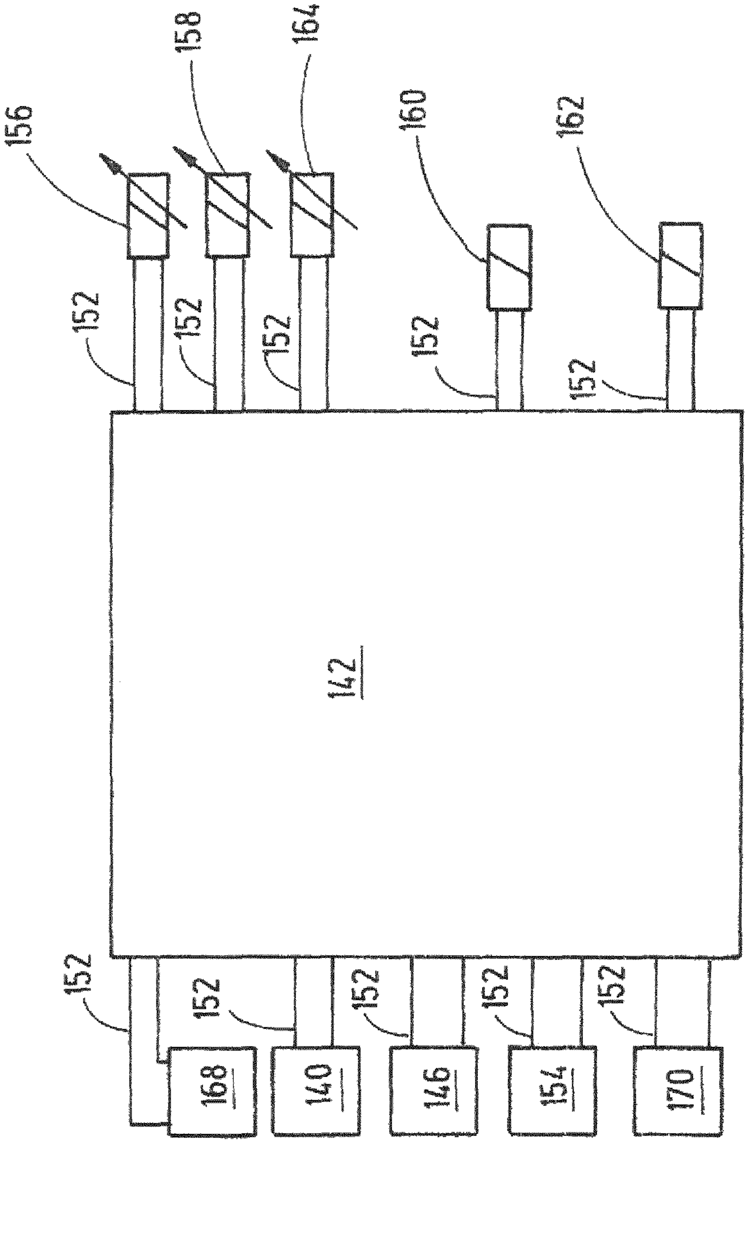
FIG. 2 shows a block diagram of a control unit for the steering device of FIG. 1.

A control unit 142 (FIG. 2) is provided for the steering device, to which the steering angle setpoint generator 140, the pressure sensing device 146, an input device in the form of a joystick 154 and, if necessary, the position monitor 108 of the steering actuator 10 are each connected via at least one electric line 152 at the input end, and at the output end the respective electromagnetic actuating devices 156, 158, 160, 162, 164 of the supply valve V1, discharge valve V2, directional valve V3 and flow-regulating valve V6 are connected. The control unit 142 can determine the switching position of the directional valve V3 using the values collected by the pressure sensing device 146.

As a result, the steering unit 12 and the flow-regulating valve arrangement 14, interconnected in a parallel hydraulic arrangement, actuate the steering actuator 10, wherein the steering unit 12 provides a type of main power supply and the flow-regulating valve arrangement 14 provides a type of auxiliary power supply for the steering actuator 10.

Furthermore, the pressure sensing device 146 and the design of the directional valve V3 with a fluid conveying connection between its first V3.1 and third V3.3 ports in its first switching position enable a functional check of the supply valve V1, the discharge valve V2 and directional valve V3 during a start-up test involving the process steps listed below:

steering end (no steering, vehicle speed <0.5 km/h);

discharge valve V2 of the flow-regulating valve arrangement 14 is actuated by 10%, wherein the pressure determined by the pressure detection device 146 drops to the tank pressure (system is unloaded);

discharge valve V2 of the flow-regulating valve arrangement 14 is closed, whereupon the pressure detected by the pressure detection device 146 may not increase, from which it can be deduced that the first end position of the supply valve V1 is functional;

supply valve V1 is actuated until the pressure detected by the pressure detection device 146 is equal to 50 bar, from which it can be deduced that the supply valve V1 is functional;

supply valve V1 is closed, wherein the pressure detected by the pressure detection means 146 may not decrease, from which it can be deduced that the respective first end positions of the directional valve V3 and of the discharge valve V2 of the flow-regulating valve arrangement 14 are functional; and discharge valve V2 of the flow-regulating valve arrangement 14 is actuated by 10%, whereupon the pressure detected by the pressure detecting means 146 drops to tank pressure, from which it can be deduced that the discharge valve V2 of the flow-regulating valve arrangement 14 is functional.

The invention claimed is:

1. A hydraulic steering device comprising:

a steering actuator;

a steering unit;

a flow-regulating valve arrangement; and a pressure sensing device, wherein:

the steering actuator is configured to be actuated by the steering unit;

the flow-regulating valve arrangement is configured to actuate the steering actuator;

the flow-regulating valve arrangement includes a discharge valve and a directional valve;

the discharge valve is a proportional servo valve;

the directional valve is configured to: (i) in an unactuated position, block a fluid-conveying connection between the discharge valve and the steering actuator; and (ii) in an actuated position, actuate the steering actuator in a first steering direction or a second steering direction; and the pressure sensing device is connected to: (i) at least one fluid line connected to the directional valve, or (ii) a supply line between a supply valve and the directional valve.

2. The hydraulic steering device of claim 1, wherein:

the discharge valve is a first discharge valve; and the steering unit includes a second discharge valve.

3. The hydraulic steering device of claim 2, wherein the second discharge valve is an electromagnetically actuated proportional valve.

4. The hydraulic steering device of claim 2, wherein the second discharge valve is a proportional servo valve.

5. The hydraulic steering device of claim 1, wherein:

the supply valve is a proportional servo valve; and the directional valve is further configured to, in the unactuated position, block a fluid-conveying connection between the supply valve and the steering actuator.

6. The hydraulic steering device of claim 5, wherein each of the supply valve and the discharge valve is a 2/2-way proportional valve.

7. The hydraulic steering device of claim 1, further comprising a supply device configured to supply the steering unit and the flow-regulating valve arrangement.

8. The hydraulic steering device of claim 1, wherein the discharge valve is an electromagnetically actuated proportional valve.

9. The hydraulic steering device of claim 1, wherein the directional valve is an electromagnetically operable switching valve.

10. The hydraulic steering device of claim 1, wherein the directional valve is a 4/3-way switching valve.

11. The hydraulic steering device of claim 1, wherein control lines of the steering unit open out into connecting lines between the directional valve and the steering actuator.

12. The hydraulic steering device of claim 11, wherein the steering actuator is a constant velocity cylinder.

13. The hydraulic steering device of claim 1, wherein:

the steering unit and the flow-regulating valve arrangement are interconnected in a parallel hydraulic arrangement, and configured to actuate the steering actuator;

the steering unit is configured to provide a main power supply for the steering actuator; and the flow-regulating valve arrangement is configured to provide an auxiliary power supply for the steering actuator.

14. The hydraulic steering device of claim 1, further comprising:

a supply device, wherein:

the flow-regulating valve arrangement further includes the supply valve and a pressure relief valve; and the pressure relief valve is connected to the supply line between the supply valve and the directional valve.

15. A hydraulic steering device comprising:

a steering actuator;

a steering unit;

a flow-regulating valve arrangement; and a supply device, wherein:

the steering actuator is configured to be actuated by the steering unit;

the flow-regulating valve arrangement is configured to actuate the steering actuator;

the flow-regulating valve arrangement includes a discharge valve, a directional valve and a supply valve;

the discharge valve is a proportional servo valve;

the directional valve is configured to: (i) in an unactuated position, block a fluid-conveying connection between the discharge valve and the steering actuator; and (ii) in an actuated position, actuate the steering actuator in a first steering direction or a second steering direction the supply device includes a swivel angle pump; and the swivel angle pump is configured to be: (i) actuated by a load-sensing pressure, which is tapped at the steering unit; and (ii) influenced by a control pressure, which is tapped in a supply line between the supply valve and the directional valve.

16. The hydraulic steering device of claim 15, wherein:

the proportional servo valve is a first proportional servo valve;

the control pressure is a first control pressure;

the flow-regulating valve arrangement further includes a second proportional servo valve configured to actuate the load-sensing pressure for the swivel-angle pump;

a first control end of the second proportional servo valve is exposed to the first control pressure in a control line; and a second control end of the second proportional servo valve is exposed to a second control pressure in a feed line to the swivel-angle pump.

17. The hydraulic steering device of claim 16, wherein the second proportional servo valve is a 3/2-way proportional valve.

* * * * *